(12) United States Patent
Rashidi et al.

(10) Patent No.: US 9,206,050 B2
(45) Date of Patent: Dec. 8, 2015

(54) CONTINUOUS PROCESS FOR PRODUCING CARBON NANOTUBES

(75) Inventors: Alimorad Rashidi, Tehran (IR); Bahman Amini Horri, Karaj (IR); Ali Mohajeri, Tehran (IR); Sasan Sadraei, Tehran (IR); Khairolah Jafari Jozani, Karaj (IR); Ali Nakhaeipor, Tehran (IR)

(73) Assignee: RESEARCH INSTITUTE OF PETROLEUM INDUSTRY (RIPI), Tehran (IR)

( * ) Notice: Subject to any disclaimer, the term of this patent is extended or adjusted under 35 U.S.C. 154(b) by 1331 days.

(21) Appl. No.: 11/726,371

(22) Filed: Mar. 20, 2007

(65) Prior Publication Data
US 2008/0274277 A1 Nov. 6, 2008

(30) Foreign Application Priority Data

Mar. 20, 2006 (EP) .................................... 06005674

(51) Int. Cl.
*C01B 31/02* (2006.01)
*C23C 16/00* (2006.01)
*B82Y 30/00* (2011.01)
*B82Y 40/00* (2011.01)

(52) U.S. Cl.
CPC ............. *C01B 31/0233* (2013.01); *B82Y 30/00* (2013.01); *B82Y 40/00* (2013.01); *C01B 31/024* (2013.01); *C01B 31/026* (2013.01)

(58) Field of Classification Search
CPC ........ C01B 31/022; C01B 31/24; C01B 31/26
See application file for complete search history.

(56) References Cited

U.S. PATENT DOCUMENTS

| | | | | |
|---|---|---|---|---|
| 2003/0039604 A1* | 2/2003 | Niu et al. | | 423/447.1 |
| 2003/0147802 A1* | 8/2003 | Smalley et al. | | 423/447.3 |
| 2003/0213364 A1* | 11/2003 | Edlund et al. | | 96/4 |
| 2004/0072683 A1* | 4/2004 | Kodas et al. | | 502/224 |
| 2004/0151654 A1 | 8/2004 | Wei et al. | | |
| 2005/0042162 A1 | 2/2005 | Resasco et al. | | |
| 2005/0123467 A1* | 6/2005 | Harutyunyan | | 423/447.1 |
| 2006/0021304 A1* | 2/2006 | Merino Sanchez et al. | .... | 55/338 |
| 2006/0039849 A1* | 2/2006 | Resasco et al. | | 423/447.3 |

FOREIGN PATENT DOCUMENTS

WO  WO 2005085130 A2 *  9/2005
WO  WO 2005113434 A1 *  12/2005

OTHER PUBLICATIONS

OSHA document on cadmium toxicity retreived from: "http://www.osha.gov/SLTC/cadmium/" on Jan. 2, 2010.*
Hidefumi Hiura et al., "Communications: Opening and Purification of Carbon Nanotubes in High Yields," Adv. Mater, 1995, vol. 7, No. 3, pp. 275 and 276.

(Continued)

*Primary Examiner* — Joel Horning
(74) *Attorney, Agent, or Firm* — Mannava & Kang, P.C.; Arash Behravesh

(57) ABSTRACT

The present invention relates to a continuous process for producing carbon nanotubes (herein after also referred to as "$CNT_S$") of single, double and/or multi-wall type, with any possible desired diameter and with high purity. The preferred embodiment provides means for continuous supply of a catalyst during the process for producing the carbon nanotubes, according to which one can achieve the advantageous continuity of the process.

23 Claims, 3 Drawing Sheets

Schematic plan of the pneumatic conveying reactor

(56) References Cited

OTHER PUBLICATIONS

R.C. Haddon, et al., "Purification and Separation of Carbon Nanotubes," MRS Bulletin, Apr. 2004, pp. 252-259.

Journal C., et al., Nature, 388, 756, 1997.
Thess A., et al., Science 273, 483ff, 1996.
Li A., et al., Science, 274, 1701ff, 1996.
Dai et al., Chemical Physics Letter 260, 471, 1996.

* cited by examiner

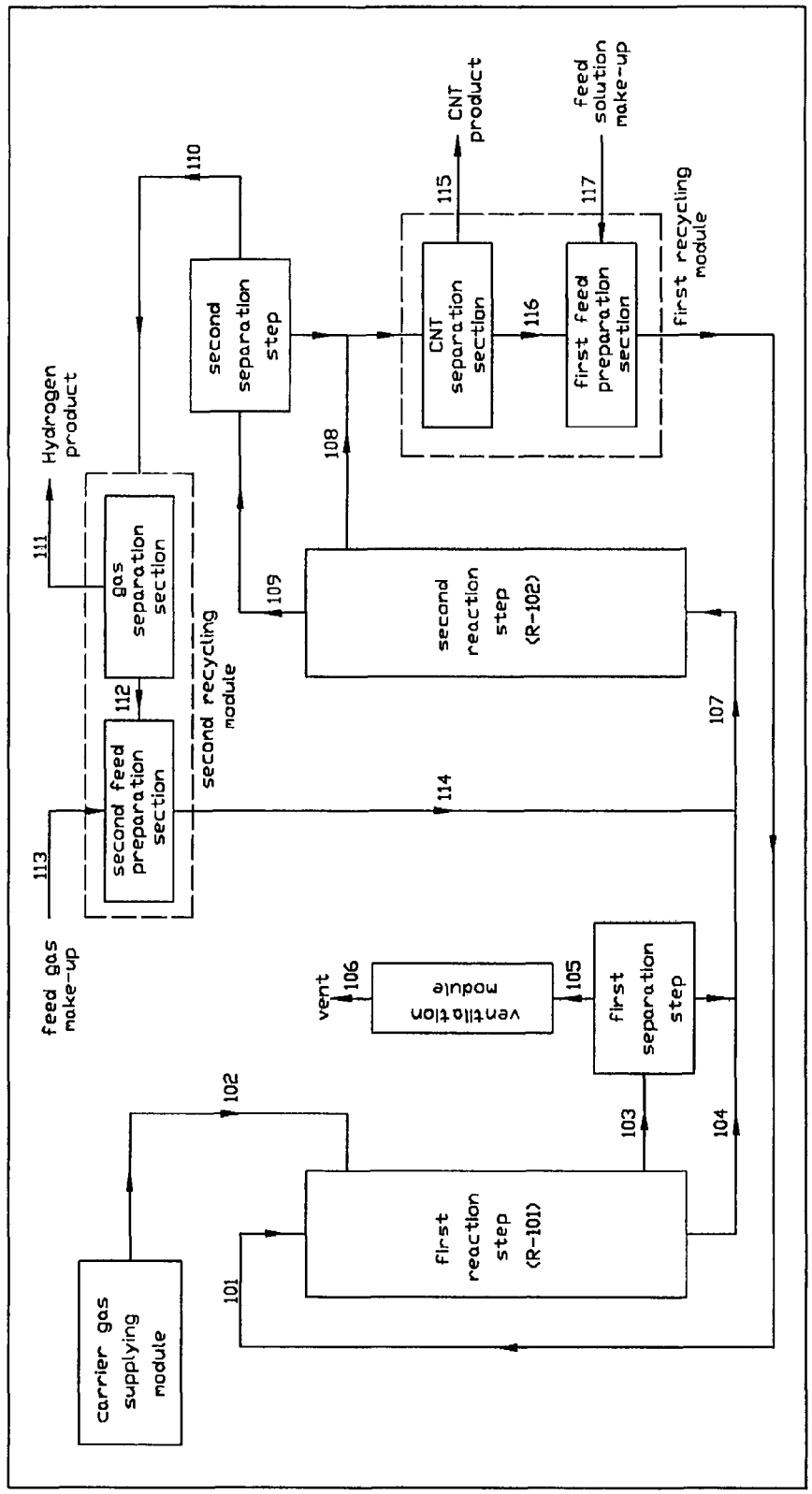
Figure 1: schematic box diagram of the CNT production plant

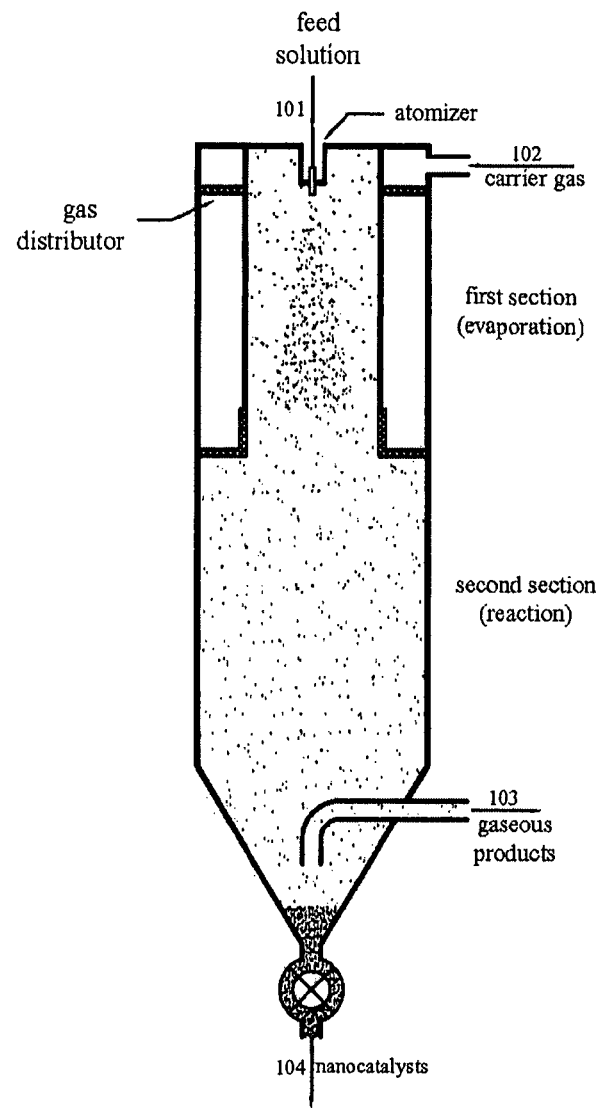
Figure 2: Schematic plan of the vertical spraying feed reactor

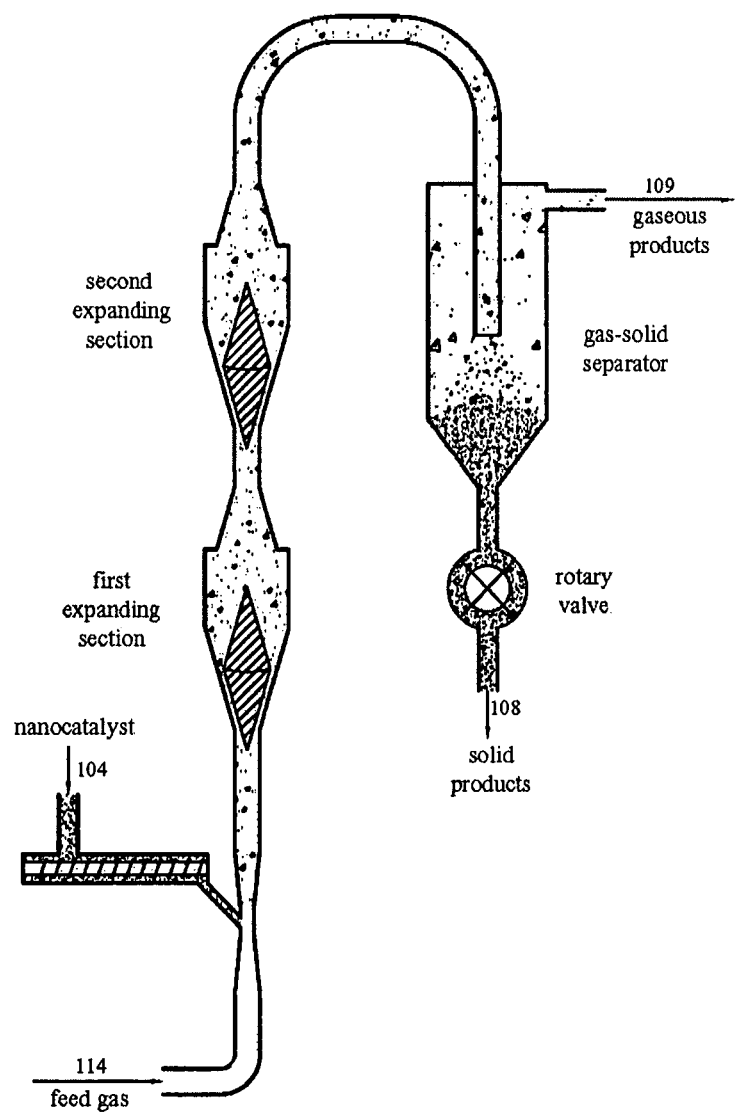
Figure 3: Schematic plan of the pneumatic conveying reactor

CONTINUOUS PROCESS FOR PRODUCING CARBON NANOTUBES

CROSS-REFERENCE TO RELATED APPLICATION

The present application claims priority to European Application No. 06005674.4 filed in the European Patent Office on Mar. 20, 2006 of which is expressly incorporated herein in its entirety by reference thereto.

BACKGROUND OF THE INVENTION

Carbon nanotubes are cylindrically rolled graphite sheets, at both ends of which there exists a half fluorene. These allotropes of graphite were first produced by an electric arc discharge method, which process finally leads to multi wall carbon nanotubes (MWCNTs) as a main product. Later on, chemical vapor deposition techniques were used and single wall carbon nanotubes (SWCNTs) were deposited on catalysts, using hydrocarbon vapor as the feed.

$CNT_S$ have unique properties, which makes them useful for different purposes, among which is their ability to be used as catalyst support material. Also, they are useful in fuel cells, for gas storage, within electronic devices, for example electronic microscopes can be highlighted. Depending on the application area, the type and size of $CNT_S$ should be controlled during the process for producing the same.

In the art, there are three major methods described for the production of $CNT_S$:

These methods include using an electric arc on a graphite target (Journal C., et al, Nature, 388, 756, 1997), laser ablation (Thess A. et al, Science 273, 483ff, 1996) and catalytic chemical vapor deposition of hydrocarbons (Li A. et al, Science, 274, 1701ff, 1996).

MWCNTs are presently produced in an industrial scale, however, single and double wall $CNT_S$ can only be produced in a scale of some hundred grams, when making us of the presently available facilities described in the art.

Dai et al. describes in Chemical. Physics. Lett. 260, 471 (1996) a selective synthesis of single wall carbon nanotubes, (SWCNTs) through decomposition of hydrocarbons over $Mo/Al_2O_3$, using VIII and VI group metals like Co and Mo, on other supports like $SiO_2$.

According to Resasco et al. single wall carbon nanotubes are produced and they also disclose a continuous process for CNT production in US 2005/0042162. A drawback of this process described in the art, however is, that it cannot be run in a final continuous manner since the catalyst has to be produced in an independent step, which comprises several preparation and calcinations steps. According to this prior art method, single wall carbon nanotubes ($SWCNT_S$) can be produced in a fluidized bed reactor, which—due to the inability of particles to fluidize—makes necessary a "prior-to-use catalyst shaping step", for limitation of the particle site to a range suited for fluidizing. That increases the residence time in the reactor and the CNTs produced by the said process must be purified by several steps after the production.

Fei, Wei et al. introduced a method for continuous production of CNTs (US 2004/0151654) according to which the catalyst is separately prepared by impregnation and then CNTs are grown over the said catalyst in a fluidized bed reactor. Fe—Cu, Ni—Cu, Co—Mn, Ni catalysts having supports based on $SiO_2$, $Al_2O_3$ and glass beads were used in the said process. The application of a fluidized bed reactor, however, leads to before mentioned drawbacks ending up with poor quality of the produced $CNT_S$.

Generally speaking, the yield of CNTs during their production is affected by several factors, such as catalyst formulation, operation parameters (including reaction temperature, pressure, residence time and oxidation/reduction and calcinations conditions), and also the type and design of the used apparatus.

Presently, the CVD (chemical vapor deposition) method is still a common technique for mass production of CNTs although it suffers from problems of time-dependent low yield, high investment and operational costs that are caused due to the high number of process steps being necessary after the production of the catalyst as well as the CNTs and still further due to the problem that the product is distributed throughout the reactor.

SUMMARY OF THE INVENTION

In one embodiment the present invention provides a continuous process for producing carbon nanotubes ($CNT_S$), wherein the required catalyst is produced and used, said process comprises two reaction steps, two separation steps and optionally two recycling steps and optionally two recycling modules wherein the process is further defined by providing a feed solution for producing a required catalyst, wherein a portion of the feed can be supplied from any suited stream or from other steps of the same process, and the required catalyst is produced, optionally by atomizing feed solutions into the reactor, with also optionally separating the catalyst;

optionally treating any toxic compound appearing due to a prior step by means of a reactive gas absorber;

producing carbon nanotubes through the so called Chemical Vapor Deposition (CVD) method, making use of the catalyst as obtained, and separating the produced carbon nanotubes from the outlet gaseous products;

optionally recycling all or at least a fraction of the gases (with or without a prior gas separation step);

separating non-reacted hydrocarbons and optionally any further desired gas by a gas separation section;

purifying the solid products by means of different chemical and physical methods;

optionally recycling remaining solutions of the purification section, with or without further processing steps.

BRIEF DESCRIPTION OF THE FIGURES

FIG. 1 shows a schematic diagram of the CNT production plant.

FIG. 2 shows a schematic drawing of a Vertical Spraying Feed Reactor (VSFR).

FIG. 3 represents a schematic overview plane of the Special Pneumatic Conveying Reactor (SPCR).

DETAILED DESCRIPTION OF THE INVENTION

The present invention relates to a continuous process for producing carbon nanotubes (herein after also referred to as "$CNT_S$") of single, double and/or multi-wall type, with any possible desired diameter and with high purity.

The preferred embodiment of the invention provides means for continuous supply of a catalyst during the process for producing the carbon nanotubes, according to which one can achieve the advantageous continuity of the process.

Still further, according to preferred embodiments, a particular apparatus and some further particular equipment is used during the process, making it possible to perform the process not only in a continuous manner but also highly efficiently while obtaining high quality products.

The process according to the invention may include purification steps, preferably during the later stage of the process for both, modifying and/or purifying the products resulting from the process or also of intermediate products in case a purification step is integrated at a stage of the process other than in the final stage.

It is an object of the present invention to provide a process for producing different types of $CNT_S$ in pilot and commercial scales, preferably ending up with controlled diameters, purities and types of CNTs.

Another object of the present invention is to provide a process making the production of the catalyst (including its calcination) as well as its recycling possible, leading to a desired continuity of the process, which makes the process faster, less space and time consuming and hence more economical.

The objects are solved by a process according to which the number of catalyst and product separation steps is reduced, which allows the process to be run fast and continuously.

One aspect within said process is also the application of a device (in principle known from the art) as the CNT production reactor, which makes it possible to distribute the products in a better suited manner, enables to control the residence time, and still further eliminates the catalyst shaping steps.

According to a preferred embodiment of the process of the invention, the gases used for reduction, that might be $H_2$ or a mixture containing $H_2$, are recycled.

With respect to the reducing gas, one should also note that one by-product of a CNT production process is $H_2$. Hence no matter what reducing gas is used, always a fraction of the gas purified in this stage is $H_2$.

According to a preferred embodiment of the process of the invention the small size of the catalyst particles leads to an advantageously reduced residence time of the catalyst, feed and product in the reactor.

According to the process of the invention a first and a second recycled stream are used, namely the first stream supplies a part of the feed for a first reaction step (nano-catalyst preparation step), and the second stream provides a fraction of the gaseous feed for the second reaction step (CNT production step).

Both recycling streams can be provided by treating the intermediate and/or final products of any step during the process and returning the desired resulting streams to any desired part of the process. Alternatively the streams can be used in any other process.

Still further, the process according to the invention is also friendly from an environmental point of view because a ventilation module integrated into the equipment eliminates toxic species, like for example $SO_x$, $NO_x$, $CO_x$, etc.

Describing the process according to the invention in more detail, in general it usually comprises two reaction steps, two separation steps, and optionally makes use of two recycling modules.

The recycling module is suited for separation/purification steps, and the module is followed by feed preparation sections for each reaction step. The recycling module may supply the feed streams for both reaction steps, as explained above.

Furthermore, the recycling modules are suited for adjusting the feed streams as to the desired composition, and still further for separating main products and by-products from the process streams.

In a first reaction step, the catalyst used in the process is produced, preferably in the form of a nano-catalyst (based on nanostructures of some metallic oxides).

In a second reaction step, the growing of carbon nanotubes on the produced catalyst, like a nano-catalyst, is carried out.

The separating steps are applied for treating the solid products in a way that they are free from gaseous species or by-products.

Carbon nanotubes, after being produced in a second reaction step and separated from the outlet gaseous products by a second separation step, are treated in the CNT purification section for purifying the CNT products as the main product of the process. The remaining liquid of this purification section is fed to any desired step of the overall process as a recycled stream, either with or without prior treatment. Said liquid stream is preferably fed to a feed preparation step, and most preferably to the feed preparation section of the first reaction step.

As mentioned, the first reaction step of the process is the catalyst preparation, followed by the second reaction step of the process, which is the step for CNT production.

The feed solution for the first reaction step is supplied from the first feed preparation section, which can be located in the first recycling module, wherein the ingredients (that are soluble salts of the metals needed for the production of the desired catalyst(s), and/or any proper additive, and/or any solvent that may be required for dissolving the mentioned ingredients) are mixed with each other in order to get feed solutions of respective desired compositions.

In the case of CNT production, the catalyst preparation unit feed comprises one or a mixture of the salts required for preparing the catalyst in the form of aqueous or nonaqueous solutions, one or a mixture of desired additives and any other substance that may be required for the production of the desired catalyst. Said solutions are prepared in a mixer and sent either to one or more vessels, or are directly injected to the system through an atomizer depending on the types of the atomizer nozzles which can be one or a combination of pressure nozzles or two fluid nozzles or any other applicable nozzle. Said mixer is a part of the first feed preparation section that is located in the first recycling module, and which, as said mixes, adjusts the composition and supplies the feed of the catalyst preparation section. According to the present invention, a part of the feed solution is supplied by using make-up streams and a second part of it is supplied from the recycling streams of the end product purification section. The solution in the mixer can have any temperature, preferred is a temperature in the range of from 40 to 80° C.

In the case of the application of pressure nozzles, any means, in particular injection vessels, can be used to continue the nozzle operation and homogenize the physical properties (e.g. their size and density) of the produced particles. Said vessels or tanks that are used to supply the solutions to the said catalyst preparation reactor, are used for the injection of the feed to the reactor in a steady state regime. The vessels, having operational pressures and temperatures of preferably 20 to 40 bar and 60 to 80° C., respectively, lead the feed to one or a group of nozzles through line 101, (see FIG. 1). Said nozzles are parts of the reactor R-101 and inject the feed solution to a first reaction step. To pressurize the liquids that are going to be injected to the reactor, compressed air or any other suited pressured gas(es) can be used.

The continuous operation of the vessels under different operation stages like filling, pressurizing and injecting is controlled with an automatic PLC system.

The feed is injected to the catalyst preparation reactor(s) through line 101. The carrier gas is supplied from the carrier gas-supplying module through line 102. The catalyst preparation reactor which can be any spraying system or a special spraying system (R-101), which is called the Vertical Spraying Feed Reactor (referred to as "VSFR" hereinafter) has a design that lets it be used either alone or in parallel with other VSFR and is suitable for any chemical reaction, preferably those of producing micro particles with nano or non-nano structures, specially for production of common catalysts for production of carbon nanotubes, preferably of CNT-production nanocatalysts. Most preferred the catalyst is the nanocatalyst for production of carbon nanotubes provided by RIPI and described in the European patent application No. EP05110431.3, included herewith by reference. Said catalyst can be used alone or in combination with any other catalyst. In the case of the desire or preference of using a mixture of catalysts, the other catalysts can be produced in parallel VSFRs that can be used, as mentioned above, in the first reaction section.

FIG. 2 depicts a schematic VSFR. Of course, any other shapes and modifications required to modify the functioning or to keep the optimum functioning of the said reactor can be carried out with the reactor. The reactor can be made of any suited heat and corrosion resistant alloy(s), most preferably of stainless steel (310 type), and can have an either one or more body layers, and comprises atomizers, gas distributor systems and rotary valves. The atomizers in the reactor can be of pressure or two fluid nozzle types. Said nozzles convert the feed to micro droplets.

The VSFR reactor can have some and preferably two operational regions, in a first of which the feed solvents are evaporated and in a next region in which the decomposition reaction happens, resulting in the formation of micro or nano catalyst of the desired type.

The required heat for the evaporation and thermal decomposition reaction is supplied through one or a combination of different direct and/or indirect heating equipments, like electric heaters, furnaces, circulation heaters, which can be used anywhere in the reactor. Preferably the heat can be supplied through a carrier gas supplying module which can be heated with either or a number of direct/indirect heaters, electrical heaters, burners or any other suitable heating system.

By direct heating through the application of a carrier gas of the reactors is meant. If the heat of the reactor is supplied through the carrier gases, they are preferred to enter the reactor having a temperature of from 700 to 800° C.

The VSFR reactor can function under any tolerable operational condition. It is however preferred to use it in a temperature range of from 400 to 800° C., and most preferably of from 500 to 700° C. and a pressure range of vacuum to several bars, preferably of vacuum to atmospheric pressure in the case of CNT-production nanocatalyst preparation. The residence time within the reactors, in case of the mentioned nanocatalyst, depending on the nature and properties of the feed, is between a few seconds to some minutes and preferably less than 20 seconds. The physical properties of the products, e.g. their size and specific surface area, are controlled through different operational conditions, feed composition and also through reactor parameters, like nozzle parameters.

The product of the first reaction step comprises the nanocatalyst(s), and gaseous species, like the carrier gases, and other gaseous species produced during the reaction. All or a fraction of the produced catalysts is transferred to the second reactor either directly or after passing through a hopper (line 104). The gaseous products of the catalyst preparation step, which may also contain suspending solid nanoparticles of the reactor 101 leave through line 103 and then are cooled down to 150 to 200° C. in a reactor after cooler and before entering a first separation step. The systems used in this step comprise one or a combination gas cyclones and or micro filters that can function either in series or parallel to one another. The solid leaving this step joins the stream in line 104 and/or enters a hopper before going to a second reaction step.

The produced gases, leaving this and/or any prior step, may contain $NO_x$, $SO_x$ or $CO_x$ and are sent to a ventilation module, wherein reactive gas absorbers and/or adsorbers, like packed bed scrubbers, wetted wall tubes, venturi scrubbers can be used either alone or in combination with each other, preferably a scrubber with a packed bed, is used. The toxic compounds are neutralized using any strong or weak basic species, preferably using alkaline solutions of sodium or potassium hydroxides.

It should also be noted that in the case of the preference to use a combination of catalysts in the second reaction step, the produced catalysts in the parallel $VSFR_s$, are mixed with each other in any desirable composition, in a prior step before entering the second reaction step.

The produced catalyst(s) can be reduced either before entering the second reactor, or after entering it or during the reaction, using one or mixture of reducing gases like $H_2$ and CO, preferably $H_2$.

The catalyst enters a second reactor together with the CNT production feed, in a manner that the feed and catalyst streams are either co- or counter-current, with co-current streams being preferred.

A fraction of the feed gas or liquid CNT production feed can be supplied through a recycling stream. The feed and catalyst, which can be any of the common catalyst(s) for production of CNTs preferably one or a mixture of any nanocatalysts for the production of CNTs, most preferably one or a combination of CNT-production nanocatalyst produced at RIPI (already cited application No. EP05110431.3) are mixed with each other before entering a second reaction step through line 107. Any suitable means for transferring the solid catalyst(s) to the reactor, especially a screw conveyor (FIG. 3) can be used for the transfer of the catalyst to a second reactor. One should make sure that all of the feeds entering the second reactor should be free from molecular oxygen and/or any other substance in any physical state and in concentration ranges that may cause undesirable or unwanted effects on either the reaction and/or the process, and/or the used apparatus. The second reactor can be either a horizontal rotary reactor, vertical tubular reactor, like moving bed reactor, pneumatic conveying system (used as a reactor called Special Pneumatic Conveying Reactor (SPCR) hereinafter). The SPCR and horizontal rotary reactor are most preferred to be used in a process according to the present invention. Said reactors can be used either singly or as a series or parallel combination of one another. In the case of application of a horizontal rotary reactor, some lifting flights can be installed inside the reactor to increase the gas/solid interfaces in the reactor. In the case of the SPCR, which is the most preferred reactor for this process, the increase in the residence time is achieved by inserting expansion section(s), as described later, in the structure of the reactor.

It is most preferred in processes according to the present invention to use one or some vertical tubular or SPCR(s), either in series or parallel to one another.

The SPCR(s) can be made of any heat and temperature resistant alloy and can comprise of one or more layers. A schematic structure of a typical SRCR reactor with two expanding sections is shown in FIG. 3.

Said reactor can have a single piece body or it can be composed of several modular similar or differently shaped and sized building blocks.

Both, in the case of a single piece SPCR or a SPCR that is composed of separate building blocks, the whole reactor may have one or several expanding sections in its structure, which in the case of the modular SPCR can be in either one, some or all of the building blocks, with either the same or different dimensions, shapes, and numbers.

Said SPCR can be used in any chemical process, preferably for catalytic reactions with a flowing feed such as those taking place in the fast fluid-bed reaction mode and most preferably for catalytic production of CNTs.

There can, depending on the chemical reaction for which the SPCR is used, be one or more gas/liquid, gas/solid, liquid/solid separators at the outlet of the said SPCR.

According to the present invention the SPCR and/or horizontal rotary reactor, and more preferably the SPCR can be used for production of CNTs through Chemical Vapor Deposition (CVD).

To produce $CNT_S$, the feed of the process can be natural gas or a mixture thereof, light gaseous or liquid paraffinic or olefinic hydrocarbons, which can be used either purely or mixed with some inert and/or reducing gases. Said feed is preferred to be pure but can also be a composition of natural gas and/or volatile liquid hydrocarbons. The feed is most preferably natural gas. A fraction of the feed can be supplied through the second recycling stream. The hydrocarbon to inert gas (like Ar, $N_2$, and/or He, preferably a mixture of $N_2$) and reducing gases (like CO or $H_2$) ratio in the feed ranges from 1/1 to 1/4, and the feed stream is heated up to 500 to 600° C. prior to entering the reactor. In the case of the application of a horizontal rotary reactor, depending on the type of the feed, the operational temperature is 800 to 1000° C. (if the feed is natural gas and methane) and it is 550° C. to 800° C. if the feed is mainly composed of $C_2H_2$ and/or $C_2H_4$.

The SPCR of the present process works in the operational temperature range of from 400 to 1100° C. and a pressure of from vacuum to several bars, and the number of the expanding section depends on the size, type of the catalyst and the required residence time.

In this respect, increasing the number of the expanding sections will increase the residence time. The number of the expanding sections in the present invention is chosen in a way that the residence time falls in the range of a few seconds to some minutes, more preferably less than 30 seconds.

The required heat of the reaction in the second reaction step is provided either directly or indirectly using one or a combination of combustion and electrical furnaces or circulation heaters, and preferably using a combustion furnace. A portion of heating of the second reactor can also be indirectly performed using the energy of the hot gases leaving reactor R-102.

In many cases, the outlet gases of R-102 can be used to heat and/or preheat its own feed or that of any other reactor before and/or after it, before and/or after entering the reactor, and/or during the reaction. Said gas can also be used either as the sole carrier gas or a make up for the carrier gas used in possible part of the process. The air used in the burners of the furnaces, surrounding R-102 can also be used for the same purpose.

The nanocatalyst(s) can be reduced either before entering R-102 or they can be reduced within the reactor itself. In the former case, in order to increase the yield and quality of the product, a little amount of water vapor can be added to the feed, in a way that the concentration of said water vapor does not exceed 1 percent of the volume of the feed under the operational temperature and pressure, and more preferably it does not exceed 0.2 percent by volume of the said feed under the said operational conditions.

In the case of reducing the catalyst(s) within the reactor, said catalyst either can be reduced by the feed or by a secondary reducing gas. If the latter case is chosen, the catalyst reduction step within SPCR comprises at least two operational zones. A first operational zone has a temperature of from 400 to 800° C. and here the catalyst(s) reduction reaction takes place and a second operational zone with a temperature of from 800 to 1100° C., and preferably of from 900 to 1000° C., which is used for the overall reaction, which suitably is a CVD reaction, accordingly to the present invention. A fraction or the entire solid product of the second reaction step is sent to a hopper through line 108 and/or it is directly sent to the product separation step. The outlet gaseous stream which contains the unreacted or produced gases together with the rest of the product of R-102, which leaves through line 109, is cooled down to 50 to 100° C. Different cooling systems can be used so that the temperature is reduced in some, and more preferably, two operational stages. The energy of the outlet stream can be used for any energy consuming process or step before, within, or after R-102.

The outlet gaseous stream of R-102 is firstly used to preheat the inlet feed of R-102, which causes a mild decrease in its temperature, and then it is cooled down to 50 to 100° C. using the cooling systems.

The outlet gaseous stream, comprising the solid CNT material and produced and/or unreacted gases are then sent to second separation section, which comprises different gas separation systems such as one or more series or parallel cyclones and micro filters.

All or a part of the gases leaving the second separation step can be either used in the same overall process or they can be used either continuously or in a batch wise mode in any other desired processes. Said gases can be used either before or after undergoing gas separation/purification stages, which can comprise one or a combination of selectively permeable membranes or Pressure Swing Adsorption (PSA) systems, and more preferably PSA systems, or any other common gas separation process.

The gas separation product(s) can be pure form of any of the gases present in either the feed or reducing gas streams and/or those produced after or within the reaction.

The most preferable gases leaving said gas separation/purification system is pure $H_2$ and the unreacted feed hydrocarbons.

Said pure $H_2$ or unreacted feed hydrocarbons can be initially used to provide the required pressure within the adsorption towers and also to overcome the pressure drop of the reactors. To do this they are compressed up to 10-12 bar. They are cooled to undergo adsorption operations while their temperature is in the range of from 30 to 50° C. The adsorption columns are packed columns, and are used in a pressurizing, adsorption/desorption and depressurizing sequence or any other sequences possible or suitable. The operational pressure of the adsorption columns is about 8-12 bar during the adsorption (pressurizing), stages while it reaches to an atmospheric or vacuum range during the desorption (depressurizing) stage. Different adsorbing materials such as CMS or zeolites and, preferably CMS, is used as the packing material and the columns are utilized in a cyclic mode with cycles of 30 to 90 seconds. The operation of the columns is controlled by a PLC system.

The pure $H_2$ or feed hydrocarbons can be used as the main feed or make up for any previous, or afterwards stages, or they can be used for any of the mentioned applications, after the addition of some suitable makeup. Said $H_2$ can supply all or a part of hydrogen required in the CNT production step.

The solid material leaving the second separation step joins the outlet solid stream of the second reaction step (line 108) before going to the product purification unit through line 115.

There it undergoes the required physical or chemical separation or purification stages.

It is preferably heated in the presence of one or a mixture of strong or weak organic and/or inorganic acids, more preferably hydrochloric, sulfuric, phosphoric, nitric, acetic, tartaric acids and most preferably, HCl, $H_2SO_4$, $HNO_3$, $H_3PO_4$. It can be either heated or left without heating, either stirred or kept steadily, in the presence of said acids for any suitable duration which is preferred to be about 1 to 24 hours, and most preferably 3 to 12 hours.

After the purification stage the CNTs product is filtered and transferred to a second purification stage which can be any suitable purification stage, preferably heating the pre-purified CNT product in the presence of strongly or weakly acidic or basic solutions of proper oxidizing or reducing reagents, most preferably in the presence of an acidic solution comprising one or a mixture of soluble salts of permanganate or dichromate and/or any suitable organic or inorganic additives.

This process is preferred to be performed while heating the solution of said purification stage to a temperature of from 40 to 80° C., more preferably of from 50 to 70° C., and the resulting product can be used as pure CNT after being filtered and washed.

The remaining solutions of acid washing and/or oxidizing/reducing stages can be used for any suitable stage within, before or after the CNT purification stage, either with or without further treatments. These streams are preferably returned to the feed preparation unit for adding adequate amount of suitable make up and undergoing certain treatments, before entering the catalyst preparation step.

Adjusting the overall operational conditions of the process according to the invention, all types of CNTs can be obtained, that are preferably single or double wall CNTs but also, if desired, multi wall CNTs.

The product has preferably a purity of 90% (by weight) or even higher.

What is claimed is:

1. A continuous process for producing carbon nanotubes (CNTs) having a purity of 90% by weight or higher wherein said process comprises two different reaction steps in separate reactors and two separation steps, comprising:
    a) providing a first feed solution for producing a catalyst,
    b) producing a catalyst with the feed solution;
    c) providing a second feed of hydrocarbons;
    d) producing carbon nanotubes through Chemical Vapor Deposition (CVD) by contacting the produced catalyst with the hydrocarbon feed, thereby obtaining carbon nanotubes, an outlet gaseous product containing non-reacted hydrocarbons in reactors comprising at least one Pneumatic Conveying Reactor (PCR) with one or more expansion sections and having a design such that the catalyst moves upward through the (PCR), wherein the number of expansion sections is chosen in a way that the CNT-residence time is less than 30 seconds and wherein the hydrocarbon feed is natural gas;
    e) separating the produced carbon nanotubes from the outlet gaseous product;
    f) separating non-reacted hydrocarbons from the outlet gaseous product;
    g) purifying the carbon nanotubes including heating the carbon nanotubes with one or a mixture of organic or inorganic acids, wherein the remaining solution is returned to one or more prior process steps with or without further treatment;
    h) separating the catalyst from the gaseous product and recycling the catalyst by means of adding such catalyst to the first feed solution for the production of the catalyst particles; and
    i) removing toxic compounds comprising $NO_x$, $SO_x$ or $CO_x$ present due to producing the catalyst with a reactive gas adsorber;
    wherein the reactor for producing the catalyst in step b) is a Vertical Spraying Feed Reactor (VSFR) ensuring continuous and integrated preparation of the catalyst in one step with a residence time of the catalyst of less than 20 seconds; and wherein the pressure in the two reaction steps b) and d) is in a range from vacuum to atmospheric pressure, and wherein by adjusting the operational conditions the produced CNTs can be obtained as single, double, or multi wall type CNTs with controlled diameter.

2. The process according to claim 1, wherein the produced catalyst is one or more nano-catalyst(s) for production of carbon nanotubes.

3. The process according to claim 1, wherein the produced catalyst for producing carbon nanotubes is used in combination with another catalyst suited for producing carbon nanotubes.

4. The process according to claim 3, wherein the other catalyst is produced within the same process and in parallel Vertical Spraying Feed Reactor (VSFR) reactors.

5. The process according to claim 1, wherein the VSFR produces micro particles with nano structures.

6. The process according to claim 1, wherein the VSFR comprises atomizers, rotary valves and an at-least-one-layer body, which said atomizers comprises at least one of pressure or two-fluid nozzles.

7. The process according to claim 1, wherein during the catalyst production step b) the temperature is in the range of from 400 to 800° C.

8. The process according to claim 7, wherein the temperature for producing the catalyst is in the range of from 500° C. to 700° C.

9. The process according to claim 1, wherein gaseous products obtained during the catalyst production step are cooled down to 150-200° C. prior to the separation of the catalyst from the gaseous products.

10. The process according to claim 1, wherein the separation of the catalyst from the gaseous product is performed by making use of one or more cyclones and micro filters.

11. The process according to claim 1, wherein the feed stream used for producing CNTs further comprises a reducing or inert gas.

12. The process according to claim 11, wherein the reducing and/or inert gas is at least one of hydrogen, carbon monoxide, nitrogen or argon.

13. The process according to claim 1, wherein the CNT-production reaction is conducted in one or more of PCR(s).

14. The process according to claim 13, wherein the temperature within the PCR is in the range of from 400 to 1100° C.

15. The process according to claim 1, wherein the catalyst is reduced before, after entering the PCR or during the reaction, with a reducing gas.

16. The process according to claim 15, wherein the reducing gas is $H_2$.

17. The process according claim 1, wherein the separated gas in step f) comprising $H_2$ and remaining feeds undergo a gas separation/purification section prior to being fed to the same system again.

18. The process of claim 17, wherein the gas separation/purification is by selective membranes or Pressure Swing Adsorption (PSA).

19. The process according to claim 17, wherein a desired gas obtained from the purification of the gases leaving the CNT-production reactor is $H_2$ and the unreacted feed hydrocarbons.

20. The process according to claim 1, wherein the acids in step g) are selected from $H_2SO_4$, $H_3PO_4$, HCl, $HNO_3$.

21. The process according to claim 1, wherein the CNT leaving the acid wash step is heated in the presence of strongly or weakly acidic or basic solutions of oxidizing or reducing agents for further purification of the products.

22. The process according to claim 21, wherein the oxidizing or reducing agents are soluble salts of dichromate and permanganate.

23. A continuous process for producing carbon nanotubes (CNTs) having a purity of 90% by weight or higher wherein said process comprises two different reaction steps in separate reactors and two separation steps, comprising:
   a) providing a first feed solution for producing a catalyst,
   b) producing a catalyst with the feed solution;
   c) providing a second feed of hydrocarbons; and
   d) producing carbon nanotubes through Chemical Vapor Deposition (CVD) by contacting the produced catalyst with the hydrocarbon feed, thereby obtaining carbon nanotubes, an outlet gaseous product containing non-reacted hydrocarbons in reactors comprising at least one Pneumatic Conveying Reactor (PCR) having a design such that the catalyst moves upward through the PCR, wherein the catalyst move upward through the PCR; and
   e) removing toxic compounds comprising $NO_x$, $SO_x$ or $CO_x$ present due to producing the catalyst with a reactive gas adsorber.

* * * * *